United States Patent [19]

Dallhammer et al.

[11] Patent Number: 4,670,829

[45] Date of Patent: Jun. 2, 1987

[54] METHOD AND APPARATUS FOR SUPPLYING AN ELECTROSTATIC PRECIPITATOR WITH HIGH VOLTAGE PULSES

[75] Inventors: Richard Dallhammer, Nuremberg; Gerhard Dönig, Erlangen; Hartmut Gaul, Röttenbach; Walter Schmidt, Uttenreuth; Franz Neulinger, Erzhausen; Helmut Schummer, Heusenstamm, all of Fed. Rep. of Germany

[73] Assignees: Metallgesellschaft Aktiengesellschaft, Frankfurt am Main; Siemens Aktiengesellschaft, Munich, both of Fed. Rep. of Germany

[21] Appl. No.: 845,927

[22] Filed: Mar. 28, 1986

[30] Foreign Application Priority Data

Mar. 29, 1985 [DE] Fed. Rep. of Germany ....... 3511622

[51] Int. Cl.⁴ ............................................ H02H 7/122

[52] U.S. Cl. ..................................... 363/57; 363/124; 307/2; 323/903; 55/105

[58] Field of Search ..................... 363/56, 57, 96, 124, 363/135, 136; 55/105, 139; 323/903; 307/2

[56] References Cited

U.S. PATENT DOCUMENTS 4,061,961 12/1977 Baker ................................ 323/239

FOREIGN PATENT DOCUMENTS 108963 5/1984 European Pat. Off. .

2162988 7/1972 Fed. Rep. of Germany .

3246057 6/1984 Fed. Rep. of Germany .

3308411 9/1984 Fed. Rep. of Germany .

83/02858 8/1983 Int'l Pat. Institute ............... 363/56

*Primary Examiner*—Peter S. Wong

*Assistant Examiner*—Judson H. Jones

*Attorney, Agent, or Firm*—Kenyon & Kenyon

[57] ABSTRACT

An electrostatic precipitator is fed high voltage pulses by a pulse generating circuit including a high voltage transformer and a first thyristor switch connected in series with a primary winding of the transformer. Magnetic saturation of the core of the high voltage transformer is prevented by recurrently short circuiting the primary winding of the transformer by means of a second thyristor switch connected in parallel to the primary winding. The second thyristor switch is closed for a period of time extending from a first instant following a high voltage pulse crest to a second instant at or before the start of a pulse generating cycle subsequent to the pulse crest.

4 Claims, 5 Drawing Figures

METHOD AND APPARATUS FOR SUPPLYING AN ELECTROSTATIC PRECIPITATOR WITH HIGH VOLTAGE PULSES

BACKGROUND OF THE INVENTION

This invention relates to a method for supplying an electrostatic precipitator with high voltage pulses generated by exciting the primary winding of a high voltage transformer having a secondary winding coupled to the electrostatic precipitator. The invention further relates to apparatus for supplying an electrostatic precipitator with high voltage pulses, in which apparatus a primary winding of a high voltage transformer with a secondary winding coupled to the electrostatic precipitator can be excited with energy transmitted from a d-c voltage source via a d-c control element or switch operated by a control unit.

It has been found that the degree of dust separation in electrostatic precipitators can be increased by subjecting the electrodes to high voltage pulses of variable amplitude and frequency as well as to a d-c voltage maintained as close as possible to the breakdown or arc-over limit of the electrodes.

The high voltage pulses generate additional charge carriers in the electrostatic precipitator without provoking the development of an arc. The high voltage pulses are usually produced by exciting the primary winding of a high voltage transformer which has a secondary winding coupled to the precipitator. Such an apparatus is disclosed for example, in German Patent Document (Offenlegungsschrift) No. 32 46 057, corresponding to commonly owned U.S. patent application Ser. No. 550,616 filed Nov. 10, 1983.

In practice, the problem is now encountered frequently that the core material of the high voltage transformer of such a supply apparatus is successively driven into magnetic saturation by the transmitted pulses, inasmuch as the pulses are generally unipolar, i.e., they have only a voltage increasing effect. With the prevailing high pulse frequencies, the saturation state is reached quickly with the result that further pulses no longer arrive at the electrostatic precipitator or arrive only with unsatisfactory quality, whereby the efficiency of the device is reduced.

An object of the present invention is to provide an improved apparatus and a corresponding improved method for supplying an electrostatic precipitator with high voltage pulses.

Another object of the present invention is to provide such an apparatus and such a method which ensure a constant high quality of high voltage pulses transmitted to the electrostatic precipitator.

Yet another, more particular object of the present invention is to provide such an apparatus and such a method in which magnetic saturation effects are reduced in a transformer coupled between a d-c voltage source and the electrostatic precipitator.

SUMMARY OF THE INVENTION

An apparatus in accordance with the present invention for supplying an electrostatic precipitator with high voltage pulses comprises a high voltage transformer having a primary winding and a secondary winding, the secondary winding being connected to the electrostatic precipitator and the primary winding being connected to a d-c voltage source. A first switching element in series with the d-c voltage source and the primary winding is operated by a first control circuit for alternately connecting and diconnecting the d-c voltage source to the primary winding. The apparatus further comprises a demagnetization device operatively coupled to the primary winding for removing residual magnetization effects in the transformer between every two successive pulses fed to the precipitator. The demagnetization device includes a second switching element connected in parallel to the primary winding of the transformer, a sensor for monitoring the pulse train (or the effects thereof) fed to the precipitator, and a second control circuit operatively coupled to the second switching element and to the sensor for switching the second switching element into conduction for a period of time extending from a first instant following a high voltage pulse crest to a second instant at or before the start of a pulse generating cycle subsequent to the pulse crest. The sensor is operatively connected to at least one of the first control circuit, the transformer and the precipitator.

In accordance with another feature of the present invention, the transformer includes a tertiary winding which forms part of a circuit for exciting the transformer in a direction opposed to a primary excitation generating the high voltage pulses fed to the precipitator.

A safety device is preferably connected in parallel to the primary winding of the transformer for closing a circuit including the primary winding upon occurrence in that circuit of an excessive voltage due to a voltage arc-over in the precipitator. The safety device advantageously includes an additional switching element connected in parallel to the second switching element and further includes an additional circuit for switching the additional switching element into conduction. The additional control circuit may comprise a series circuit with a Zener diode connected between an anode of the additional switching element and a firing terminal thereof.

A method in accordance with the present invention comprises a series of steps for supplying an electrostatic precipitator with high voltage pulses, the precipitator being connected to a secondary winding of a high voltage transformer which has a primary winding connected to a d-c voltage source. In one step of the method, the d-c voltage source is alternately connected and disconnected to the primary winding of the transformer, whereby a high voltage pulse train is generated and fed to the precipitator. The pulses fed to the precipitator are monitored and, in response to the results of this monitoring step, one end of the primary winding of the transformer is coupled to an opposite end thereof (i.e., the primary winding is short circuited -- preferably through a resistor) for a period of time extending from an first instant following a high voltage pulse crest to a second instant at or before the start of a pulse generating cycle subsequent to that pulse crest.

The apparatus and method in accordance with the present invention cyclically restore the magnetization of the high voltage transformer, i.e., cyclically remove the residual magnetization effects arising from the high voltage pulse train. The removal of the residual magnetization effects ensures an undiminished transmission of the high voltage pulses to the electrostatic precipitator.

The closing of the circuit including the primary winding upon the occurrence therein of an excessive voltage due to a voltage arc-over in the precipitator protects the pulse generating device against voltage peaks swaying back from the electrostatic precipitator via the high voltage transformer.

DETAILED DESCRIPTION

Figure 1:
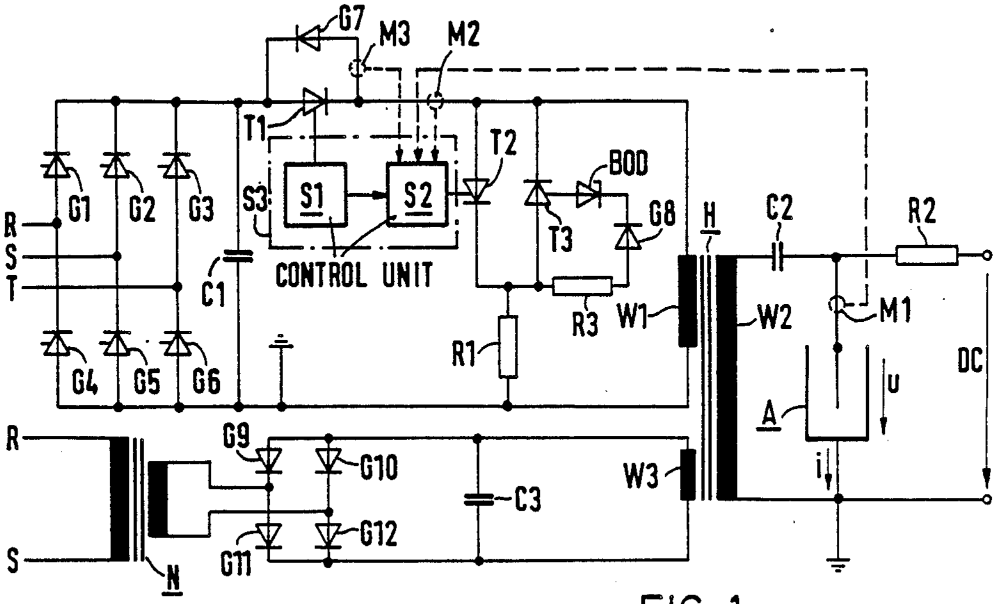
FIG. 1 is a circuit diagram of an apparatus for supplying an electrostatic precipitator with high voltage pulses, in accordance with the present invention.

As illustrated in FIG. 1, an apparatus for supplying an electrostatic precipitator A with high energy pulses is supplied with power from a three-phase network with phases R, S and T. Via controlled rectifiers G1–G6, a d-c voltage of variable magnitude is generated at a capacitor C1 and is fed, by the firing of a thyristor T1 under the control of a first control unit S1, to a primary winding W1 of a high voltage transformer H, whereby a high voltage pulse is induced in a secondary winding W2 of the transformer. This pulse is transmitted via a coupling capacitor C2 to electrostatic precipitator A and is superimposed on a d-c voltage DC transmitted to the precipitator via a resistor R2. The feeding of high voltage pulses to the electrostatic precipitator results in the generation of additional charge carriers in the electrostatic precipitator A without the development of an arc.

A diode G7 conducts to capacitor C1 currents swinging back via high voltage transformer H and to that extent serves in a well known manner to recover energy and also to protect the series thyristor T1. Other conventional protective measures for thyristor T1 (e.g., the series connection of several thyristors, monitoring the recovery time of thyristor T1, protective firing of a thyristor, current-limiting by chokes, etc.) are also possible.

The firing frequency of thyristor T1, set by control unit S1, depends on the operating parameters of electrostatic precipitator A such as the type of dust, the degree of dust loading, the desired degree of filtration of the dust laden air and the d-c voltage DC.

Figure 2:
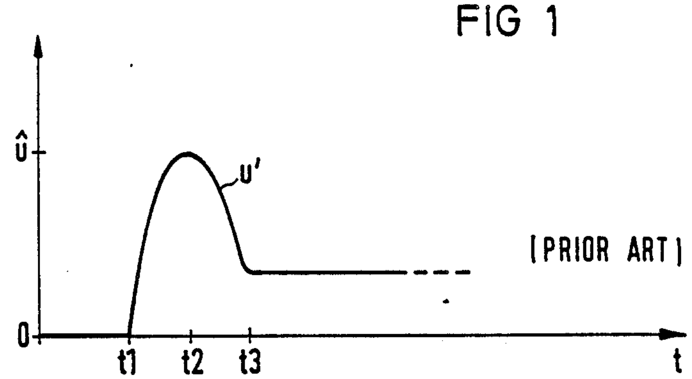
FIG. 2 is a graph of a voltage across electrodes of an electrostatic precipitator shown in FIG. 1, showing effects of residual magnetization of a high voltage transformer in the circuit of FIG. 1.
Figure 3:
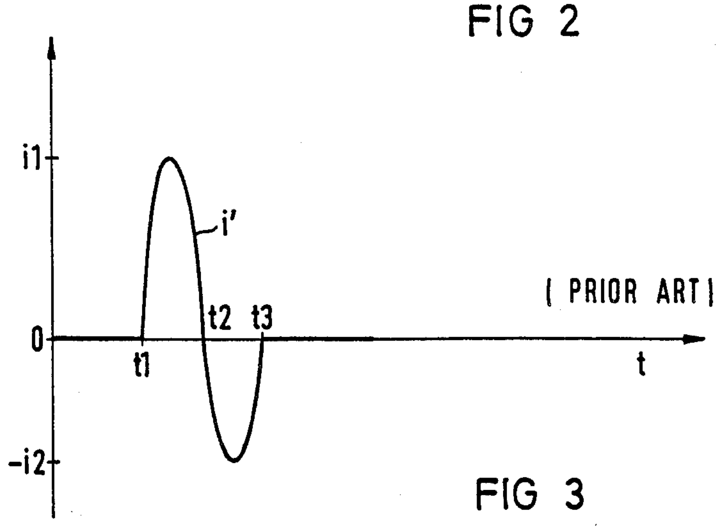
FIG. 3 is a graph of a current to an electrode of the precipitator of FIG. 1, also showing effects of residual magnetization of the high voltage transformer of FIG. 1.

To illustrate the operation and a drawback of conventional pulse generating devices, reference will now be made to FIGS. 2 and 3 where the voltage u' and the current i' of electrostatic precipitator A are shown for the case that demagnetization of high voltage transformer H, implemented in accordance with the present invention, is not undertaken. It is to be noted that, for purposes of measurement, d-c voltage source DC is not connected to electrostatic precipitator A or resistor R2.

At an instant t1, thyristor T1 is fired by control unit S1 and primary winding W1 of high voltage transformer H is excited. A pulse induced in the secondary winding W2 of the high voltage transformer H by the excitation in the primary winding charges electrostatic precipitator A. In response to the charging current, precipitator A acts as a capacitor and is charged between instants t1 and t2 up to a voltage value u. Subsequently, from instant t2 to a time t3, electrostatic precipitator A is discharged ($i'<0$) via a series circuit consisting of coupling capacitor C2 and secondary winding W2. However, precipitator A is not discharged completely: a residual charge and residual voltage remain, primarily because the discharge current which is induced in primary transformer winding and which swings back via diode G7 to capacitor C1 must flow against the voltage at capacitor C1. Accordingly, the excitation of the core of high voltage transformer H between the points in time t2 and t3 is not equal to the opposed excitation between the points in time t1 and t2 (see FIG. 3: i2, i1). Even if magnetically soft core materials are used, a residual magnetization of the core of high voltage transformer H remains after a pulse is transmitted and is increased with each following pulse until the core material is magnetically saturated and further pulses are either no longer transmitted or only insufficiently transmitted.

Figure 4:
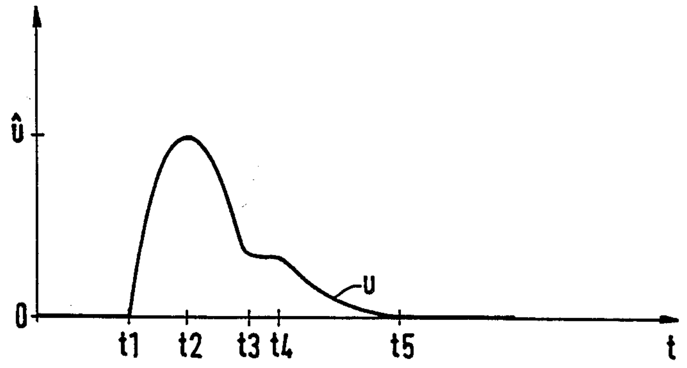
FIG. 4 is a graph of the voltage across the electrodes of the electrostatic precipitator of FIG. 1, wherein the transformer of FIG. 1 is demagnetized in accordance with the invention.
Figure 5:
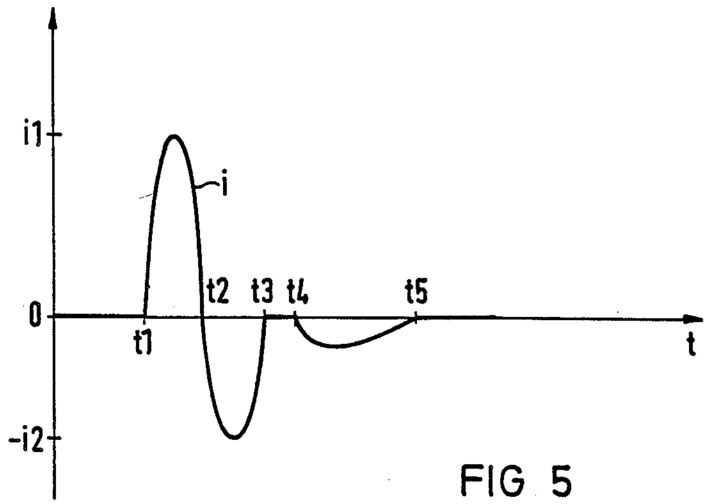
FIG. 5 is a graph of the current to an electrode of the precipitator of FIG. 1, showing the effects of a demagnetization of the transformer of FIG. 1 in accordance with the invention.

FIGS. 4 and 5 show the voltage u and the current i of electrostatic precipitator A for the case that high voltage transformer H is demagnetized in accordance with the present invention (measurement again without d-c voltage DC). In this case, the asymmetry of the excitation of the high voltage transformer in the course of the transmission of a pulse is eliminated. To achieve this elimination, a thyristor T2 is connected in parallel to the primary winding W1 of high voltage transformer H exemplarily via a current-limiting resistor R1. Thryistor T2 is switched into conduction at an instant t4 (FIGS. 4 and 5) by a second control unit S2 on the basis of information from first control unit S1 and/or measurement signals from high voltage transformer H or electrostatic precipitator A. Instant t4 occurs subsequent to the crest of the high voltage pulse, i.e., after thyristor T1 has returned to a nonconducting state. Thyristor T2 continues to conduct until the start of the next pulse generating cycle.

By short circuiting the primary winding of the transformer, the discharge of electrostatic precipitator A, which discharge proceeds via a magnetically coupled resonant series circuit comprising primary winding W2 and capacitor C2, is completed at an instant t5. Successive opposite excitations of the transformer core are made approximately equal in magnitude and therefore neutralize each other with respect to residual magnetization of transformer H.

Instant t4, at which time control unit S2 fires thyristor T2, can be as close as possible to the time t3 at which the discharge current becomes zero. Merely for reasons of illustration a distinct interval is shown between these points in time in FIGS. 4 and 5. With respect to the demagnetization function, thyristor T2 could even be fired immediately after time t2, i.e., after thyristor T1 has returned to the nonconductive state, to aid the discharging process. In this case, however, the part of the energy which returns in the process and is otherwise fed back between times t2 and t3 to capacitor C1 is dissipated by the short circuit of the primary winding caused via thyristor T2 and resistor R1.

To determine the firing time t4 of thyristor T2, control unit S2 may evaluate measurement signals from the high-voltage side of transformer H to ascertain when the discharge current of electrostatic precipitator A flowing in secondary winding W2 becomes zero. For example, sensors M1 may be provided for monitoring the current flowing to an electrode of precipitator A or the voltage across the electrodes of the precipitator. Alternatively, due to the magnetic coupling at the transformer, the measurement of the discharge current induced on the primary side of the transformer, which measurement can be carried out substantially more simply, can be monitored by a sensor M2 to the same end. Since the feedback discharge current must first flow through diode G7, monitoring the current through this diode by a sensor M3 is sufficient: if the current through diode G7 becomes zero (such as at time t3), control unit S2 can fire thyristor T2.

The connection between first control unit S1 and second control unit S2 shown in FIG. 1 serves for synchronizing control unit S2 relative to contol unit S1 in order to prevent, for example, untimely firing of thyristor T2. In addition, because of the connection between control units S1 and S2, unit S2 may be operated with a pure time control, e.g., solely in response to timing signals from unit S1 based on a given pulse width. The timing signals are synchronized with the disconnection times of thyristor T1.

If because of the energy spent for generating charge carriers in electrostatic precipitator A or because of ohmic losses, the discharge of the precipitator in accordance with the aforedescribed method and apparatus is not sufficient, in spite of completeness, for a symmetrical excitation of the core of high voltage transformer H. a permanent counterexcitation of the transformer can be provided in a conventional manner as an additional measure for aiding the demagnetization process. Pursuant to this additional measure, the transformer H has a tertiary winding W3 placed on its core. A d-c current produced via tertiary winding W3 is oriented in a direction opposed to the primary excitation of transformer H. Tertiary winding W3 is connected to two phases R and S of the a-c power network by a low voltage transformer N, rectifiers G9 to G12 and a capacitor C3.

Control units S1 and S2 need not be realized in the form of separate systems. Combining them in a central control unit S3 is possible and may be desirable in many cases.

Preventing magnetic saturation of high voltage transformer H leads to an effective transmission of pulses from the primary side of the transformer to the secondary side thereof and thereby to electrostatic precipitator A. However, an undiminished transmission of pulses from the secondary side to the primary side is also possible so that particularly in the case of short circuits in electrostatic precipitator A, and specifically in the case of breakdowns or arc-overs between the electrodes, voltage peaks can occur on the primary side of high voltage transformer H, from which peaks or excessive voltages series thyristor T1 must be isolated. Besides the abovementioned conventional protective measures, short circuiting of primary winding W1 can also be used.

For this purpose, an additional thyristor T3 is connected in parallel to primary winding W1 exemplarily via current-limiting resistor R1. If the voltage at winding W1 exceeds a critical value, a break over (Zener) diode BOD in a control circuit including a resistor R3 and a diode G8, becomes conducting and fires thyristor T3 so that the voltage at primary winding W1 breaks down. The current then flowing through thyristor T3 has a direction opposed to the current which thyristor T2 must carry cyclically. The functions of thyristors T2 and T3 can be combined in a single controlled bidirectionally conductive semiconductor component.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the descriptions and illustrations herein are proffered by way of example to facilitate comprehension of the invention and should not be construed to limit the scope thereof.

What is claimed is:

1. An apparatus for supplying an electrostatic precipitator with high voltage pulses, comprising:

a high voltage transformer having a primary winding and a secondary winding, said secondary winding being connected to the electrostatic precipitator;

a d-c voltage source;

coupling means for connecting said d-c voltage source to said primary winding;

a first switching element disposed in said coupling means in series with said d-c voltage source and said primary winding;

first control means operatively connected to said first switching element for operating same to alternately connect and disconnect said d-c voltage source to said primary winding;

demagnetization means operatively coupled to said primary winding for removing residual magnetization effects in said transformer between every two successive pulses fed to said precipitator, said demagnetization means including a second switching element, sensor means and second control means, said second switching element being connected in parallel to said primary winding, said sensor means being operatively connected to at least one of said first control means, said transformer and said precipitator for monitoring the pulses fed to said precipitator, said second control means being operatively coupled to said second switching element and said sensor means for switching said second switching element into conduction for a period of time extending from a first instant following a high voltage pulse crest to a second instant at or before the start of a pulse generating cycle subsequent to said pulse crest; and safety means operatively connected in parallel to said primary winding for closing a circuit including said primary winding upon the occurrence in said primary winding of an excessive voltage due to a voltage arcover in said precipitator, said safety means including an additional switching element connected in parallel to said second switching element and further including additional control means for switching said additional switching element into conduction upon the occurrence in said primary winding of an excessive voltage due to a voltage arcover in said precipitator.

2. An apparatus as defined in claim 1 wherein said transformer includes a tertiary winding and means including said tertiary winding for exciting said transformer in a direction opposed to a primary excitation generated to form the high voltage pulses fed to said precipitator.

3. An apparatus as defined in claim 2 wherein said first control means and said second control means comprise portions of a single control unit.

4. An apparatus as defined in claims 1, 2 or 3 wherein said additional control means includes a series circuit with a Zener diode, said series circuit being connected between an anode of said additional switching element and a firing terminal thereof.

* * * * *